United States Patent
Alden (10) Patent No.: US 7,206,131 B2
(45) Date of Patent: Apr. 17, 2007

(54) OPTIC ARRAY FOR THREE-DIMENSIONAL MULTI-PERSPECTIVE LOW OBSERVABLE SIGNATURE CONTROL

(76) Inventor: Ray M. Alden, 808 Lake Brandon Trail, Raleigh, NC (US) 27610

( * ) Notice: Subject to any disclaimer, the term of this patent is extended or adjusted under 35 U.S.C. 154(b) by 518 days.

(21) Appl. No.: 09/970,368

(22) Filed: Oct. 2, 2001

(65) Prior Publication Data

US 2002/0090131 A1   Jul. 11, 2002

Related U.S. Application Data

(63) Continuation-in-part of application No. 09/757,053, filed on Jan. 8, 2001, now abandoned.

(51) Int. Cl.
*G02B 27/10* (2006.01)

(52) U.S. Cl. ........................ 359/618; 428/919
(58) Field of Classification Search ................ 359/618; 342/3; 250/205; 385/116, 154, 118, 119; 428/919

See application file for complete search history.

(56) References Cited

U.S. PATENT DOCUMENTS

| | | | | |
|---|---|---|---|---|
| 5,220,631 A | | 6/1993 | Grippin | ...................... 385/115 |
| 5,307,162 A | * | 4/1994 | Schowengerdt | ............. 348/122 |
| 6,459,076 B1 | * | 10/2002 | Schlenker | .................... 250/205 |
| 6,655,102 B1 | * | 12/2003 | LaRue | ....................... 52/311.1 |

FOREIGN PATENT DOCUMENTS

| WO | WO 99/10766 | 8/1998 |
|---|---|---|
| WO | WO 01/31384 A1 | 10/2000 |

OTHER PUBLICATIONS

Bouhannache, Redouane—Protest Against Pending U.S. Appl. No. 09/970,368, filed Jan. 14, 2004.

Adaptive Camouflage NPO-20706 Moynihan, Philip -Caltech and Langevin, Maurice Tracer Round Associates.

* cited by examiner

*Primary Examiner*—Ricky Mack (57) ABSTRACT

The invention described herein represents a significant improvement for the concealment of objects and people. Thousands of light receiving segmented pixels and sending segmented pixels are affixed to the surface of the object to be concealed. Each receiving segmented pixel receives colored light from the background of the object. Each receiving segmented pixel has a lens such that the light incident upon it is segmented to form focal points along a focal curve (or plane) according to the light's incident trajectory. In a first embodiment, this incident light is channeled by fiber optics to the side of the object which is opposite to each respective incident light segment. The light which was incident on a first side of the object traveling at a series of respective trajectories is thus redirected and exits on at least one second side of the object according to its original incident trajectory. In this manor, incident light is redirected as exiting light that mimics the incident light's trajectory, wavelength, color, and intensity such that an observer can "see through" the object to the object's background. In a second embodiment, this incident light is segmented according to trajectory, and detected electronically by photo diodes. It is then electronically reproduced on at least one second side of the object by arrayed LEDs. In this manor, incident light is reproduced as exiting light which mimics trajectory, wavelength, color, and intensity such that an observer can "see through" the object to the background. In both embodiments, this process is repeated many times, in segmented pixel arrays, such that an observer looking at the object from any perspective actually "sees the background" of the object corresponding to the observer's perspective. The object having thus been rendered "invisible" to the observer.

20 Claims, 11 Drawing Sheets

Figure 2a - Prior Art
P's View

Figure 2b - Prior Art
Q's View

Fig. 11a - Prior Art - Ray Trace of Grippen

Fig. 11b - Prior Art - Ray Trace of Grippen

Fig. 11c - Prior Art - Ray Trace of Grippen

OPTIC ARRAY FOR THREE-DIMENSIONAL MULTI-PERSPECTIVE LOW OBSERVABLE SIGNATURE CONTROL

CROSS REFERENCE TO RELATED APPLICATIONS

This application is a Continuation-In-Part of application Ser. No. 09/757,053 filed Jan. 8, 2001 now abandoned.

BACKGROUND FIELD OF INVENTION

The concept of rendering objects invisible has long been contemplated in science fiction. Works such as Star Trek and The Invisible Man include means to render objects or people invisible. The actual achievement of making objects disappear however has heretofore been limited to fooling the human eye with "magic" tricks and camouflage. The latter often involves coloring the surface of an object such as a military vehicle with colors and patterns which make it blend in with its surrounding.

The process of collecting pictorial information in the form of two dimensional pixels and replaying it on monitors has been brought to a very fine art over the past one hundred years. Pryor cloaking devices utilize two dimensional pixels presented on a two dimensional screen. The devices do a poor job of enabling an observer to "see through" the hidden object and are not adequately portable for field deployment.

More recently, three dimensional pictorial "bubbles" have been created using optics and computer software to enable users to "virtually travel" from within a virtual bubble. The user interface for these virtual bubbles are nearly always presented on a two dimensional screen, with the user navigating to different views on the screen. When presented in a three dimensional user interface, the user is on the inside of these bubbles. These bubbles are not intended for use as nor are they suitable for cloaking an object.

The present invention creates a three dimensional virtual image bubble on the surface of an actual three dimensional object. By contrast, observers are on the outside of this three dimensional bubble. This three dimensional bubble renders the object invisible to observers who can only "see through" the object and observe the object's background. The present invention can make military and police vehicles and operatives invisible against their background from nearly any viewing perspective.

BACKGROUND DESCRIPTION OF PRIOR INVENTION

The concept of rendering objects invisible has long been contemplated in science fiction. Works such as Star Trek and The Invisible Man include means to render objects or people invisible. Prior Art illustrates the active camouflage approach used in U.S. Pat. No. 5,220,631. This approach is also described in "JPL New Technology report NPO-20706" August 2000. It uses an image recording camera on the first side of an object and a image display screen on the second (opposite) side of the object. This approach is adequate to cloak an object from one known observation point but is inadequate to cloak an object from multiple observation points simultaneously. In an effort to improve upon this, the prior art of U.S. Pat. No. 5,307,162 uses a curved image display screen to send an image of the cloaked object's background and multiple image recording cameras to receive the background image. All of the prior art uses one or more cameras which record two dimensional pixels which are then displayed on screens which are themselves two dimensional. These prior art systems are inadequate to render objects invisible from multiple observation points. Moreover, they are too cumbersome for practical deployment in the field.

U.S. Pat. No. 5,220,631 Grippin, discloses a coherent fiber optic bundle as a means to transfer light from a first side of an object to a second side of an object. The Grippin art is not able to transfer light efficiently and coherently as can the present invention. Each Grippin pixel can transfer only one trajectory of light with fidelity and Grippin neither anticipates nor provides any means to enable light incident upon a single lens to be emitted from a plurality of lenses as is required in order to transfer off axis light with fidelity. Conversely, the Grippin system does not anticipate nor provide any means for allowing light incident upon a plurality of lenses to be emitted from a single lens. Moreover Grippin provides no means to enable light incident upon a single lens to be emitted from multiple sides of an object according to its incident trajectory. One can easily show through ray tracing how these short comings render the Grippin system inadequate for effectively transferring a coherent image from one side of an object to another side of an object even if the designer knows the exact position of an observer. Moreover the system is completely inadequate for coherently camouflaging an object in an environment were multiple observers can be located in multiple unknown positions because, as ray tracing reveals, each observer would only receive perspective correct light from a very small portion of the pixels and would receive incoherent light from the vast majority of pixels or no light at all from the majority of pixels. The Grippin system and other systems being only two dimensional.

The process of collecting pictorial information in the form of two dimensional pixels and replaying it on monitors has been brought to a very fine art over the past one hundred years. More recently, three dimensional pictorial "bubbles" have been created using optics and computer software to enable users to "virtualy travel" from within a virtual bubble. The user interface for these virtual bubbles are nearly always presented on a two dimensional screen, with the user navigating to different views on the screen. When presented in a three dimensional user interface, the user is on the inside of the bubble with the image on the inside of the bubble's surface.

The present invention creates a three dimensional virtual image bubble on the outside surface of an actual three dimensional object. By contrast, observers are on the outside of this three dimensional bubble. This three dimensional bubble renders the object within the bubble invisible to observers who can only "see through the object" and observe the object's background. The present invention can make military and police vehicles and operatives invisible against their background from nearly any viewing perspective.

BRIEF SUMMARY

The invention described herein represents a significant improvement for the concealment of objects and people. Thousands of directionally segmented light receiving pixels and directionally segmented light sending pixels are affixed to the surface of the object to be concealed. Each receiving pixel segment receives colored light from one point of the background of the object. Each receiving pixel segment is positioned such that the trajectory of the light striking it is known.

In a first, fiber optic embodiment, the light striking each receiving pixel segment is collected and channeled via fiber optic to a corresponding sending pixel segment. Said sending pixel segment's position corresponding to the known trajectory of the said light striking the receiving pixel surface. In this manner, light which was received on one side of the object is then sent on the same trajectory out a second side of the object. This process is repeated many times such that an observer looking at the object from nearly any perspective actually sees the background of the object corresponding to the observer's perspective. The object having been rendered "invisible" to the observer.

In a second, electronic embodiment, information describing the color and intensity of the light striking each receiving pixel segment (photo diode) is collected and sent to a corresponding sending pixel segment (LED). Said sending pixel segment's position corresponding to the known trajectory of the said light striking the receiving pixel surface. Light of the same color and intensity which was received on one side of the object is then sent on the same trajectory out a second side of the object. This process is repeated many times such that an observer looking at the object from nearly any perspective actually sees the background of the object corresponding to the observer's perspective. The object having been rendered "invisible" to the observer.

OBJECTS AND ADVANTAGES

Accordingly, several objects and advantages of the present invention are apparent. It is an object of the present invention to create a three dimensional virtual image bubble surrounding or on the surface of objects and people. Observers looking at this three dimensional bubble from any viewing perspective are only able to see the background of the object through the bubble. This enables military vehicles and operatives to be more difficult to detect and may save lives in many instances. Likewise, police operatives operating within a bubble can be made difficult to detect by criminal suspects. The apparatus is designed to be rugged, reliable, and light weight.

The electronic embodiment can alternatively be used as a recording means and a three dimensional display means. The present invention provides a novel means to record visual information and to playback visual information in a three dimensional manor which enables the viewer of the recording to see a different perspective of the recorded light as he moves around the display surfaces while viewing the recorded image.

Further objects and advantages will become apparent from the enclosed figures and specifications.

DETAILED DESCRIPTION OF THE INVENTION INCLUDING OPERATION

Figure 1:
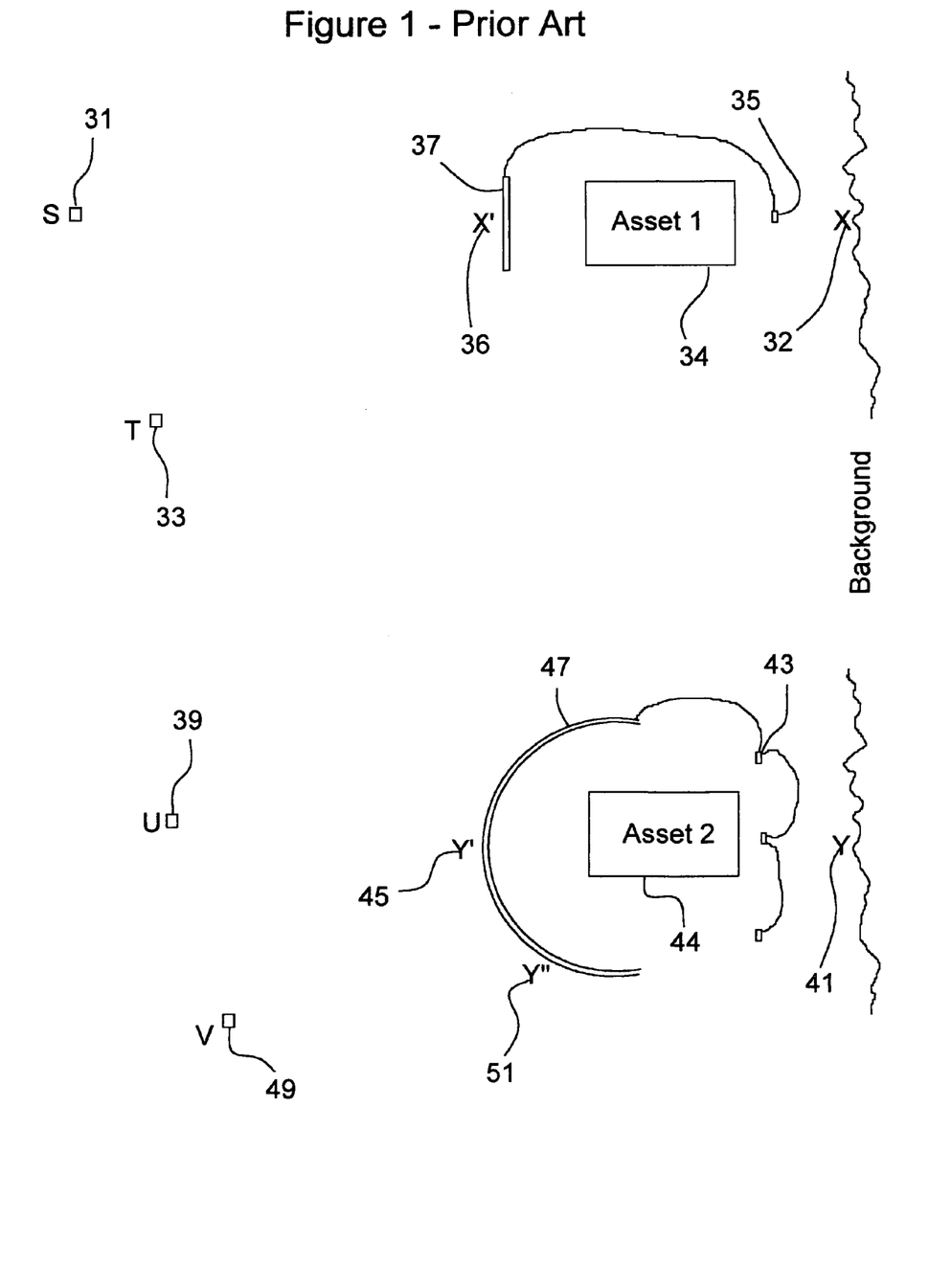
FIG. 1 prior art illustrates the shortcomings of prior art of U.S. Pat. No. 5,220,631 and of U.S. Pat. No. 5,307,162.

FIG. 1 prior art, illustrates the shortcomings of prior art of U.S. Pat. No. 5,220,631 and of U.S. Pat. No. 5,307,162. The top half of FIG. 1 illustrates the active camouflage approach used in U.S. Pat. No. 5,220,631. This approach is also described in "JPL New Technology report NPO-20706" August 2000. Asset 1 34 has a screen or image sender 37 on one side of it. An image receiver 35 on the opposite side of Asset 1 captures an image of the background which is then presented on the image sender. Background point X 32 is represented on the screen as X' 36. Note that for an observer at point S 31 this scheme does present a reasonable cloaking apparatus because background points line up with the observer such as X compared with X'. Unfortunately, for observation positions located anywhere other than S, the image sender presents an image that does not correspond with the background. An observer at point T 33 for example can see Asset 1 and can also see back ground point X and background representation point X'. The Asset is only cloaked from a narrow range of viewing positions. Additionally, when Asset 1 needs to be repositioned, it would be very cumbersome to concurrently reposition the image sender display screen Obviously this two dimensional display screen approach in the prior art has significant shortcomings as field deployable active camouflage.

The bottom half of FIG. 1—Prior Art illustrates the art of U.S. Pat. No. 5,307,162. Here a curved image sender display screen 47 together with multiple image receiving cameras 43 are used to overcome the shortcomings of the above discussed flat screen approach. An observer at point U 39 does see a reasonable representation of the background behind Asset 2 44. The observer at point V 49 however actually sees two representations of point Y 41 at Y' 45 and Y" 51. When considering deployment theaters where surroundings are distinctive such as buildings in urban areas, especially where the enemy has familiarity with the locations of background structures, such easily detected problems with the existing active camouflage schemes are not acceptable. Additionally, when Asset 2 needs to be repositioned, it would be very cumbersome to concurrently reposition the image sender display screen. Moreover, in today's complex theater conditions it is often not possible to predetermine from which viewing perspective an enemy will be seeing our asset, indeed the enemy may be on all sides of the asset. In essence, this is still a two dimensional representation presented on a curved two dimensional display screen.

Figure 2:
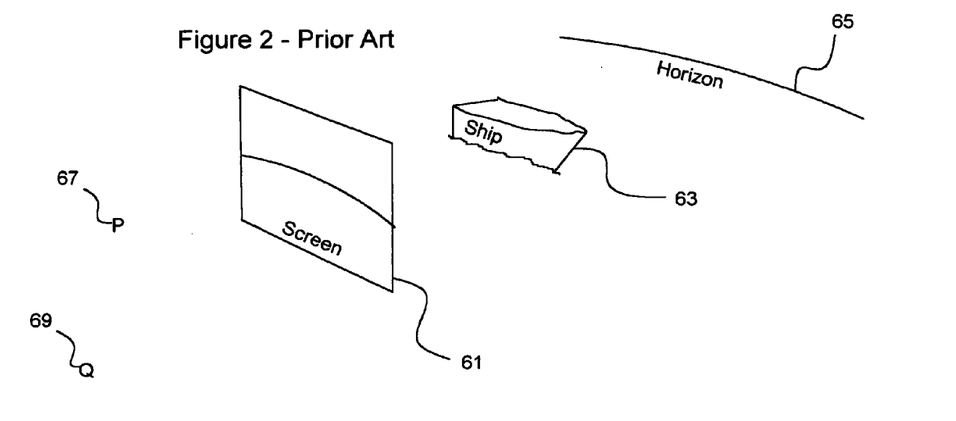
FIG. 2 prior art further illustrates the shortcomings of prior art.
Figure 2A:
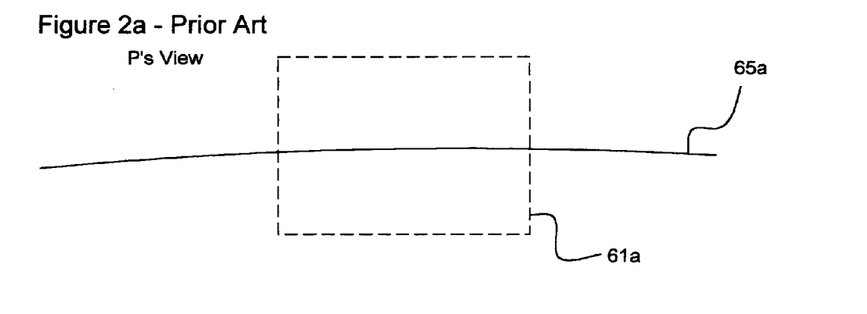
FIG. 2a prior art is a first observer's perspective of the FIG. 2 objects.
Figure 2B:
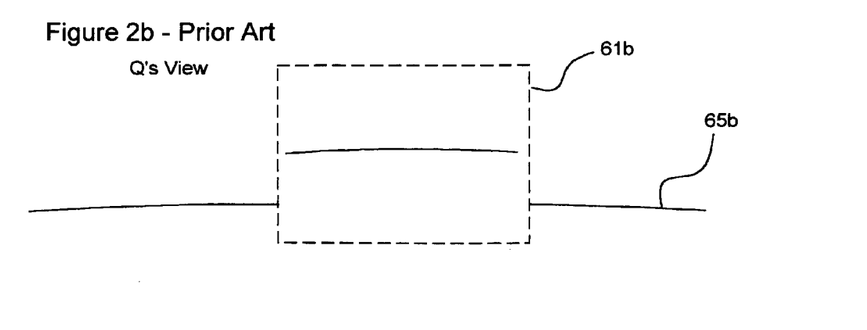
FIG. 2b prior art is a second observer's perspective of the FIG. 2 objects.

FIG. 2 prior art further illustrates the shortcomings of prior art described in FIG. 1. FIG. 2 depicts a very simple cloaking scenario, that of cloaking a Ship 63 against a Horizon 65. A deployed display screen 61 is deployed between two observers at points P 67 and Q 69. The Screen duplicates the image of the Horizon behind the Ship. FIG. 2a prior art is a first observer's (P) perspective of the FIG. 2 objects. This scheme works well from the P observation point, as depicted in FIG. 2a, P's View is that of an uninterrupted Horizon 65a compared to the display screen 61a. FIG. 2b prior art is a second observer's (Q) perspective of the FIG. 2 objects. Q can be either at lower elevation or at a greater distance than is P. In either case, Q's View as illustrated in FIG. 2b, shows a significant distortion in the positioning of the Horizon 65b compared to display screen 61b. The FIG. 2 sequence underscores the problem with prior art attempts to cloak even against quite simple backgrounds.

Figure 3:
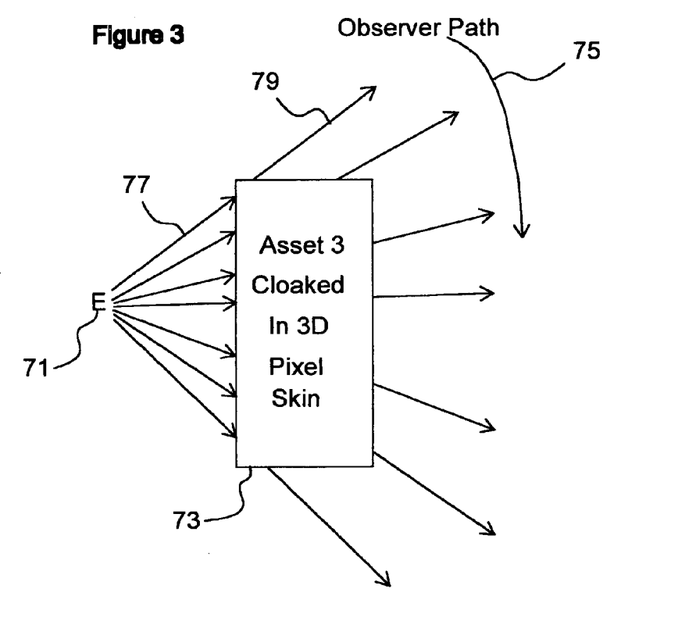
FIG. 3 shows the novel effect of the present invention rendering an object (asset) invisible from nearly any viewing perspective.

FIG. 3 shows an ideal cloaking system that is achievable by the present art. The novel effect of the present invention is that of rendering an object invisible from nearly any viewing perspective. The top section of FIG. 3 illustrates what the present technology (referred to herein as 3D Pixel Skin) can achieve. Background object E 71 can be observed at the correct light trajectory by an observer as he moves past the cloaked object along an observer path 75. By receiving background light from point E at a large number of points on the asset 3 73, replicating the background point E at a large number of points located on the surface of asset 3, the cloak accurately simulates how a background is perceived by any observer in any position and effectively renders the asset 3 invisible to an observer even as the observer moves around relative to the asset and in close proximity to the asset. Light reflected off of object E 71 is collected by light collectors on the asset which separates it according to its incident trajectory. A first trajectory 77 is collected on one side of the asset, it is then channeled by fiber optics to exit (or in an alternate embodiment electronically reproduced to exit) from a point on the asset corresponding to (directly in line with) its original trajectory as exiting light 79. This process is repeated many times such that light from object E 71 (and all other background points in all directions) is collected on one side of the asset and then exits on the other side of the asset. Thus the background points can be "seen through" the asset rendering the asset invisible. As will be further discussed later, the 3D pixel skin consists of preformed rigid panels that are affixed to the surface of the asset and connected to one another such that each light receiving pixel segment (later defined) is communicating with a corresponding light sending pixel segment (later defined) and wherein corresponding segments are along the same light trajectories such as first trajectory 77 and exiting light 79.

The bottom section of FIG. 3 further illustrates that the 3D Pixel Skin Cloaked Asset 87 is invisible to any observer at any observation point due to light receipt and transmittance (or light simulation in the electronic embodiment) from a vast number of trajectories. Observation points F 81 and G 89 are examples of two such observation points that both simultaneously see light trajectories and colors from all background objects with the correct light trajectories and orientations. A first light trajectory 85 is collected at the surface of 3D Pixel Skin Cloaked Asset 87 said light is diverted (or recorded in the electronic embodiment) such that it exits on it original trajectory as exiting light 83. Note that the observer can see all of the light trajectories coming from all of the background points as though the 3D Pixel Skin Cloaked Asset 87 wasn't there. Simultaneously, G 89 also sees all of the background points as if the 3D Pixel Skin Cloaked Asset 87 wasn't there. For example, light 91 from a sample background point is received and diverted (or electronically reproduced) as asset 4 exiting light 93 such that the G 89 observer can "see through" 3D Pixel Skin Cloaked Asset 87 and observe light 91. As will be later described, collecting light from many different trajectories at many different points on all sides of an asset and then diverting that light in a fiber optic embodiment (or reproducing it in an electronic embodiment) such that light exits the asset on identical trajectories, at identical intensities, and with identical colors (essentially equivalent) to the light that is incident upon the surface of the asset, renders the asset "invisible" from nearly any observation point.

Figure 4:
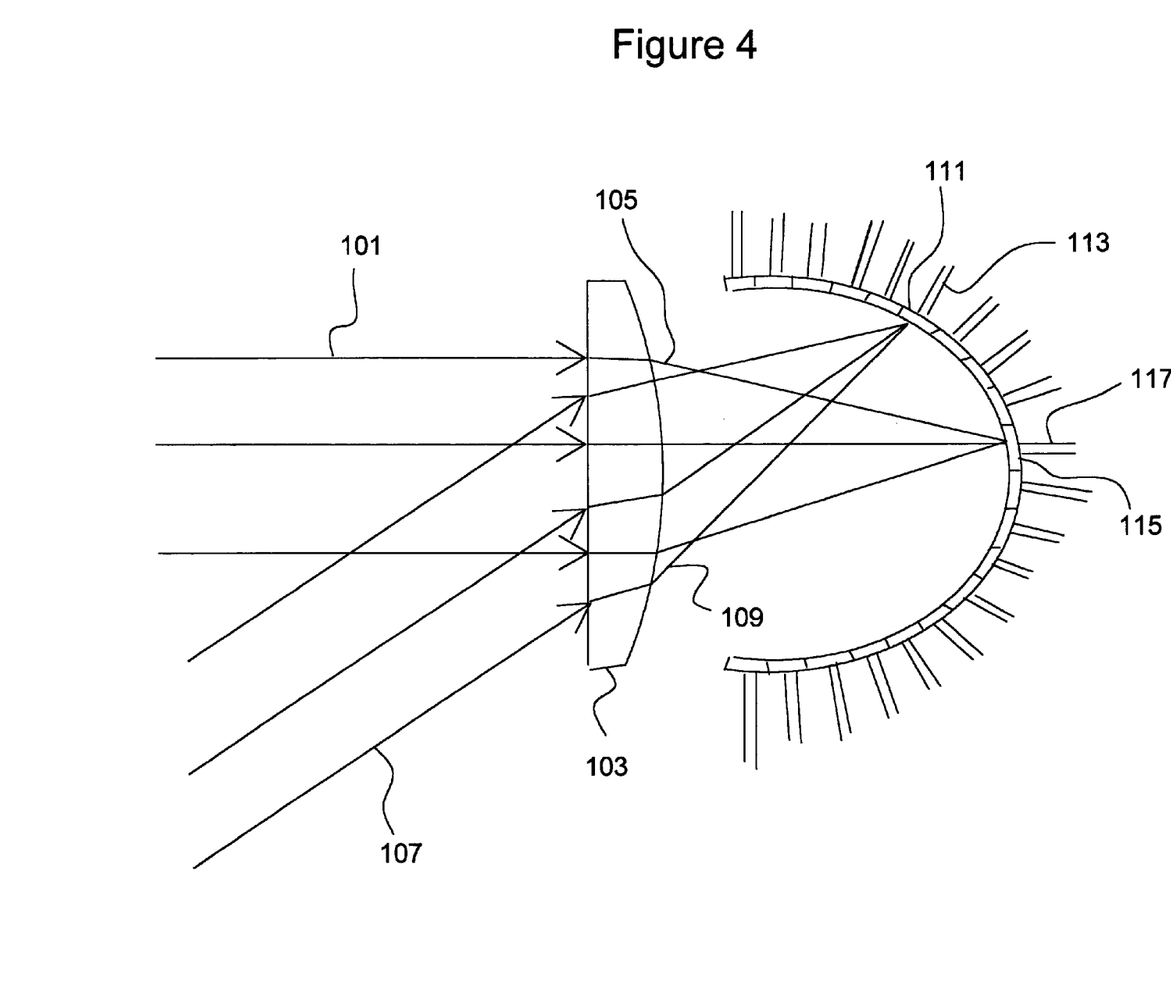
FIG. 4 is a side view of one segmented pixel of the fiber optic (first) embodiment.

FIG. 4 is a cut-away side view of one segmented pixel of the fiber optic (first) embodiment. The pixel in FIG. 4 both receives light from and sends light to multiple directions simultaneously though the arrows for simplicity show light going only into the pixel. A primary optic 103 causes received light from different directions (trajectories) to form respective focal points along a focal curve (or plain). Received trajectory 107 represents light of one such trajectory (or from one background point). The Received trajectory 107 is focused by primary optic 103 and exits as focusing light 109 traveling toward a focal curve (or plane). The focal curve is divided into segments such as first focal collecting segment 111, each focal segment receives light from a different origination trajectory or background point. Each of these segments feeds the light it collects into a respective fiber optic such as first fiber optic relay 113. The fiber optic is welded along the focal curve such that the focusing light 109 is injected efficiently into the first fiber optic relay 113. All of the other fibers (possibly hundreds) are likewise welded such that the focal curve collecting apparatus is a rigid structure. This rigid structure as described later is rigidly connected to the primary optic 103 such that the components shown in FIG. 4 are all rigidly connected together. Note that each pixel has an array of fiber optics each of which collects light from a single focal point, wherein each focal point contains light from a common trajectory (or origination point). Similarly a second light trajectory 101 is focused by primary optic 103 to be injected into a second fiber optic 117 which resides in a focal curve segment 115. Many such fibers receive light from many such light trajectories. All the light trajectories having been divided into focal points for injection into the respective fibers. It should be noted as is made clear later that light also simultaneously travels out of the fibers and primary optic 103 in the exact opposite directions. (This can be visualized by reversing the directions of all of the arrows on the depicted light.) The segmented focal curve collector can be manufactured as a one piece bowl shaped transparent plastic structure to which fiber optics can be affixed by a welding or gluing process.

Figure 5:
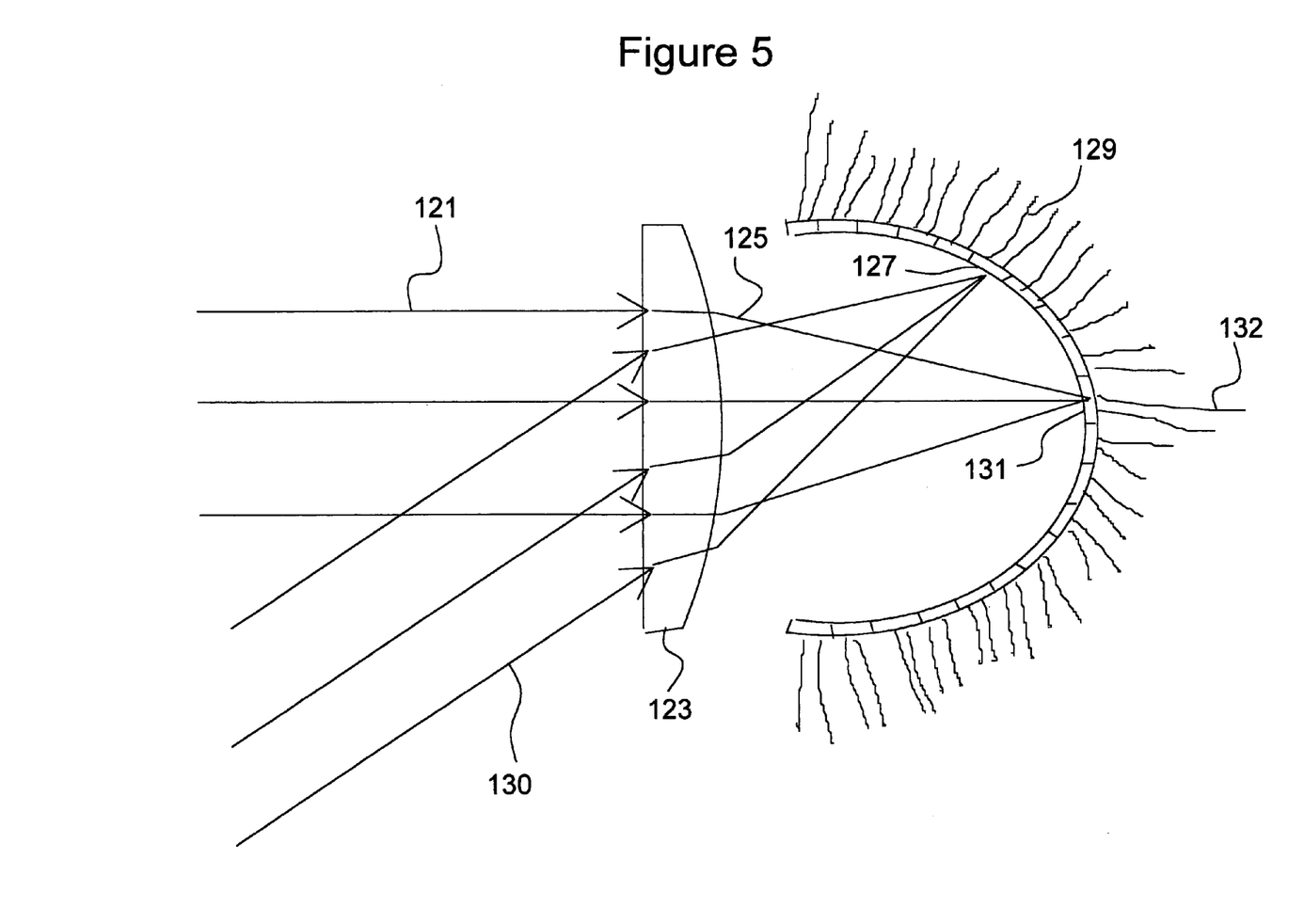
FIG. 5 is a side view of one segmented pixel of the electronic (second) embodiment.

FIG. 5 is a side view of one segmented pixel of the electronic (second) embodiment. FIG. 5 illustrates an electrooptic sender and receiver of light from a range of trajectories. A second primary optic 123 causes light from each respective trajectory (or background point) to form a respective focal point along a focal curve (or plane). Only two incoming trajectories are shown but in practice many trajectories of light enter the primary optic and form focal points along the focal curve (or plane). Positioned on the focal curve is a segmented array of photo diodes and LEDs. A first photodiode 127 being one photodiode which collects light from one focal point and a first LED 131 being one such LED that sends light (not shown) from a given focal point to the primary optic. Wires such as receiving wire 129 carry the electronic signal describing received light to a CPU (not shown) and wires such as sending wire 132 carry the energy from a CPU and driver circuit to power a respective LED to send light (not shown). The segmented electronic pixel receives light from many trajectories (background points) and sends light to many trajectories (to simulate light received from other pixels as later described.) The focal curve (or plane) is manufactured identically to that of FIG. 4 except LED's such as first LED 131 and photo diodes such as first photodiode 127 are embedded along the focal curve to send and receive light respectively. All of the components described in FIG. 5 are connected to form one rigid pixel cell which itself is part of a large panel of similar pixel cells.

Figure 6:
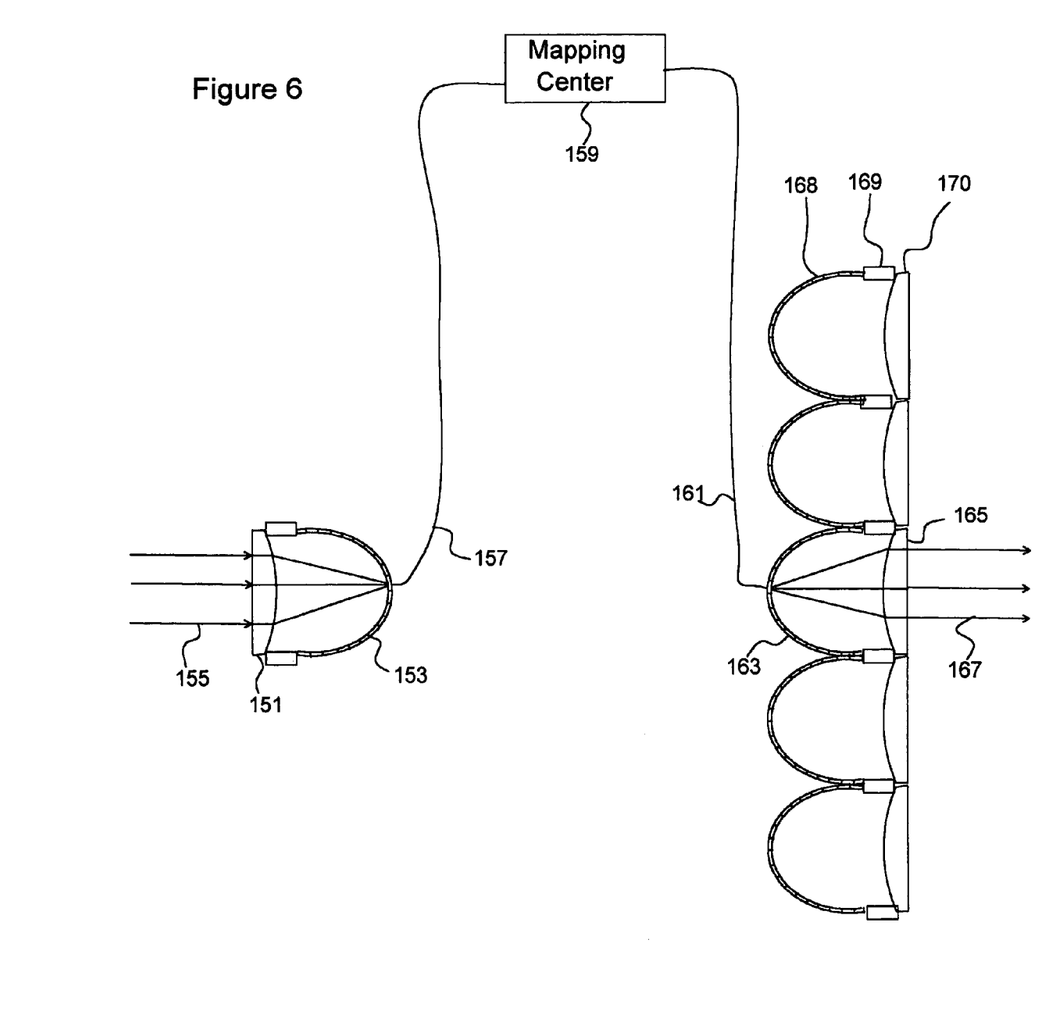
FIG. 6 illustrates the one to one light receiving and sending relationship of a fiber optic pixel.

FIG. 6 illustrates the one to one light receiving and sending relationship of a fiber optic pixel segment. FIG. 6 illustrates some pixels similar to those of FIG. 4 (or alternately FIG. 5). Light traveling in a first trajectory 155 passes through a third primary optic 151 where it is caused to form a focal point along a focal curve 153. Located on the focal curve is a fiber optic 157 which collects the focused light and carries it to a mapping center 159. The map of where the first trajectory 155 light should be directed (such that it exits on the same trajectory at which it was incident) has been pre-established in a mapping process as discussed later. The mapping center redirects the light to a corresponding second fiber 161. The corresponding second fiber 161 fiber delivers the light to the focal curve of a corresponding pixel cell 163 from which the light diverges until it reaches a corresponding second primary lens 165 which sends the light on a desired trajectory 167. Note that the desired trajectory 167 trajectory corresponds to (is the same as) the path that the first trajectory 155 light would have traveled had it not encountered the cloaked asset. An observer therefore sees the first trajectory 155 light just as he would have had the cloaked object not been there. In a rigid structure, light traveling to the third primary optic 151 pixel from the first trajectory 155 relative trajectory, will always emerge from the corresponding second primary lens 165 pixel at the desired trajectory 167. All of the light arrows can be reversed and in practice, light is always traveling in both directions. The same pixel combination also cooperates in reverse, with light entering the opposite trajectory at desired trajectory 167 being redirected to exit in the opposite direction at first trajectory 155. In a fixed map (rigid system), the fiber optic 157 and corresponding second fiber 161 will always carry light of identical trajectories in both directions simultaneously. In practice a cloaked object is covered by many such segmented pixel cells each dividing light into many distinct incident and exiting trajectories. This causes an observer to "see through" the asset to the background behind the asset. It should be noted that sheets of segmented pixel skin consist of the focal plane receiving apparatus 168, a rigid connecting structure 169, and a fourth primary optic 170. To the sheets are attached the hundreds or thousands of individual fibers (or in the alternate embodiment LEDs and photodiodes). These sheets are rigid and can be mounted on the surface of any asset. Each sheet is plugged into either one another or into a centralized mapping center where inter-pixel segment communication is arrange such as mapping center 159.

Figure 7:
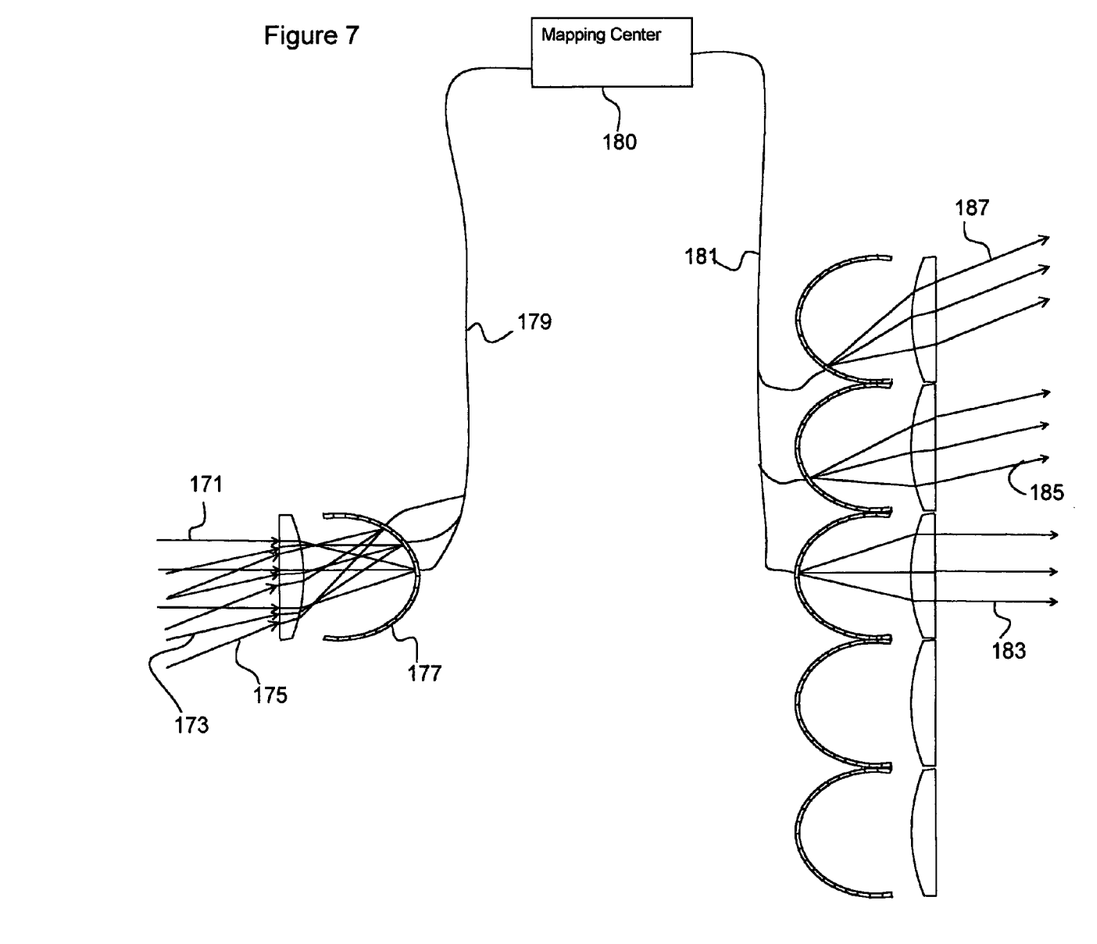
FIG. 7 illustrates the many trajectory one to one light receiving and sending relationship of a fiber optic pixel.

FIG. 7 illustrates the many to one light receiving and sending relationship of a segmented fiber optic pixel (a pixel receives light from many directions each of which is segmented and sent to a respective segment of many pixels). FIG. 7 illustrates some pixel cells operating cooperatively with light from multiple trajectories. Light from a first trajectory 171, light from a second trajectory 173 and light from a third trajectory 175, each enter a primary optic. Each light trajectory is caused to form respective focal points along a focal curve 177. At the focal curve, an array of fiber optics, each respectively collects light from one original trajectory. A fiber optic bundle 179 carries the light to a fiber optic mapping center 180 where the light is redirected to corresponding fiber optic cables 181. The first trajectory 171 light is directed out a first corresponding pixel at its original trajectory 183. The second trajectory 173 light is directed out a second corresponding pixel at its original trajectory 185. The third trajectory 175 light is directed out a third corresponding pixel at its original third trajectory 187. Thus light received from one pixel cell is divided into its origination trajectories (or background points) and directed to the series of pixel cells that corresponds to each respective trajectory. If a single pixel cell has one hundred receiving segments, it will have relationships with one hundred corresponding sending segments each located in one of one hundred pixel cells. Again, the light flows exactly in the reverse direction simultaneously.

Figure 8:
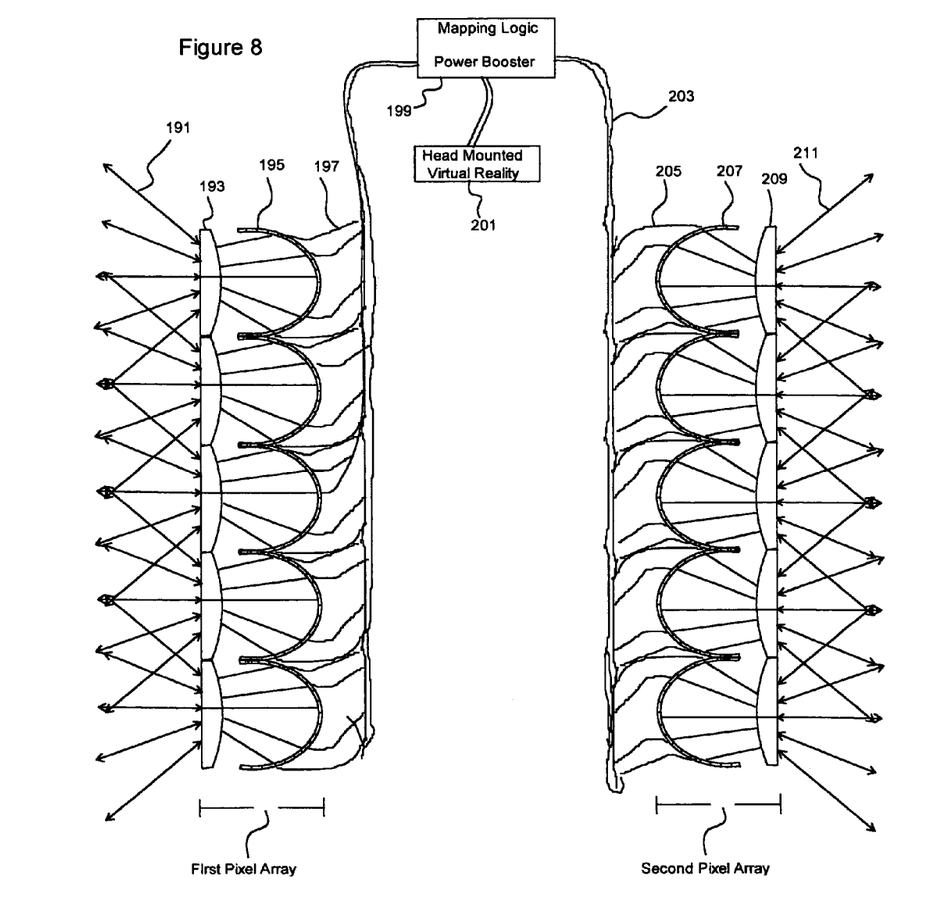
FIG. 8 illustrates the many trajectory one to one light receiving and sending relationship of a electronic pixel array.

FIG. 8 illustrates the many trajectories of light receiving and many trajectories of light sending occurring concurrently in the electronic (second embodiment) pixel array. FIG. 8 illustrates a series of pixel cells operating cooperatively. In practice light is being received by each pixel from a multitude of directions 191 and light is being sent from each pixel in a multitude of opposite directions 211. FIG. 8 shows the LED and photodiode arrays within each pixel operating cooperatively to receive light, send electric signals representing the light's frequencies and intensity, these signals are wired to an electronic mapping center 199 which amplifies the signals and sends corresponding power to the respective LEDs that can produce light which will simulate that received and send it at the same trajectory as received. Each pixel both receives and sends light. One additional use can come from the electro-optic embodiment (as opposed to the all fiber optic embodiment). Namely, since all of the information about the light coming into the cloaked asset is passed through a CPU in the electronic mapping center 199, the information can be fed to a VR viewing system 201, a person inside of the cloaked asset, wearing a head mounted virtual reality (VR) unit can "see through" the walls of the cloaked asset. They can see a precise three dimensional representation of their surroundings from within the cloaked asset.

In practice, many thousands of such pixel cells, each containing tens of focal point receiving segments all operating collectively are required to achieve near invisibility from any observing perspective. It should be underscored that each pixel receives light from a multitude of directions. If a pixel has one hundred focal point collectors, they will cooperate with one hundred other pixels which will send light in one hundred different trajectories. The same one hundred pixels will each send light from one respective trajectory to that same pixel cell. This can be seen in the mapping illustrations FIGS. 9a and 9b. Further, the pixel cells are connected to one another to form a sturdy flat panel.

The deployed panel is glued or other wise fastened to the surface of the object which is to be cloaked. This is the case with the assault beach craft of FIGS. 9a and 9b.

Figure 9A:
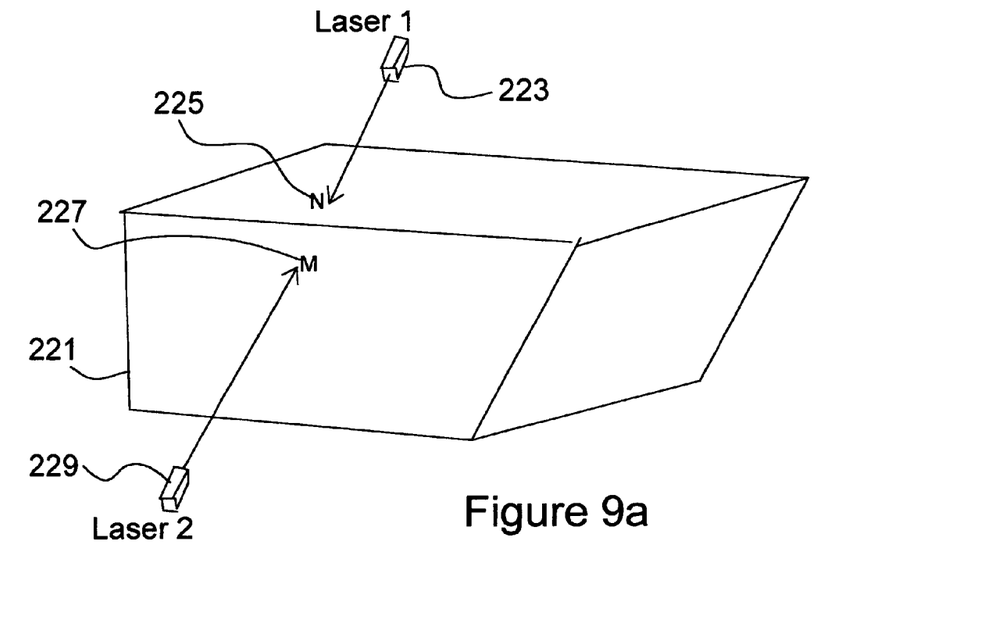
FIG. 9a shows a pixel mapping process where a first light trajectory is mapped from a pixel "M" segment to a pixel "N" segment.
Figure 9B:
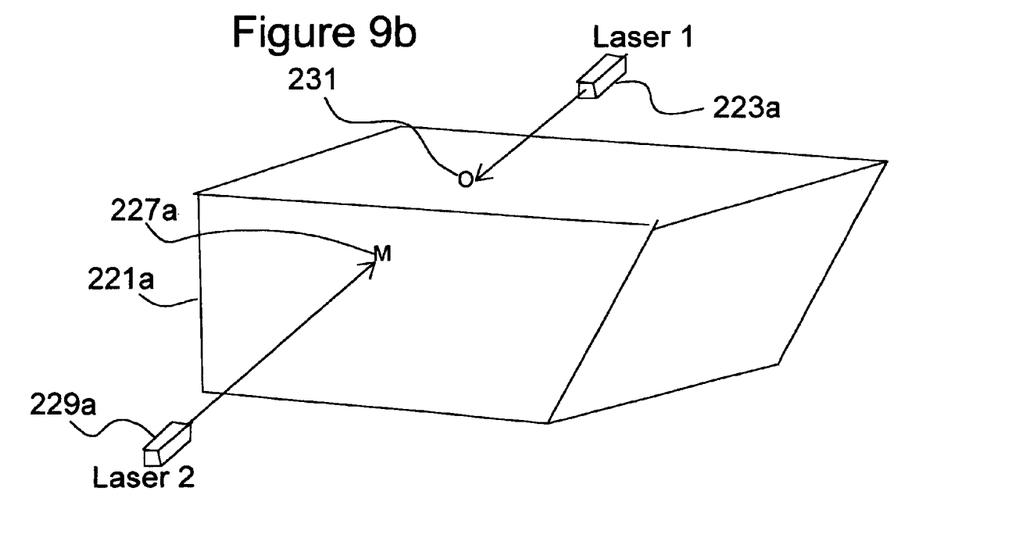
FIG. 9b shows the pixel mapping process of FIG. 9a where a second light trajectory is mapped from a pixel "M" segment to a pixel "O" segment.
Figure 10:
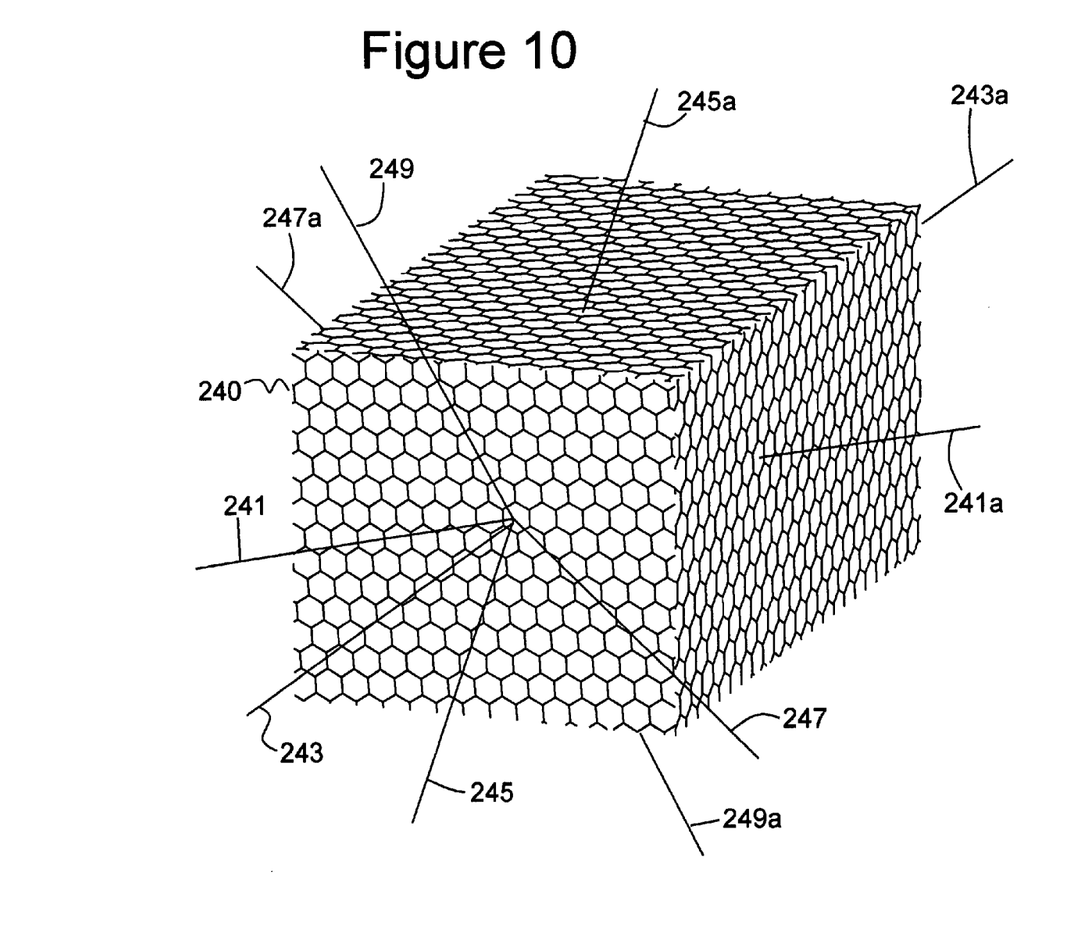
FIG. 10 illustrates that one pixel cell has segments that correspond to pixel cell segments on multiple sides of the cloaked object.
Figure 11A:
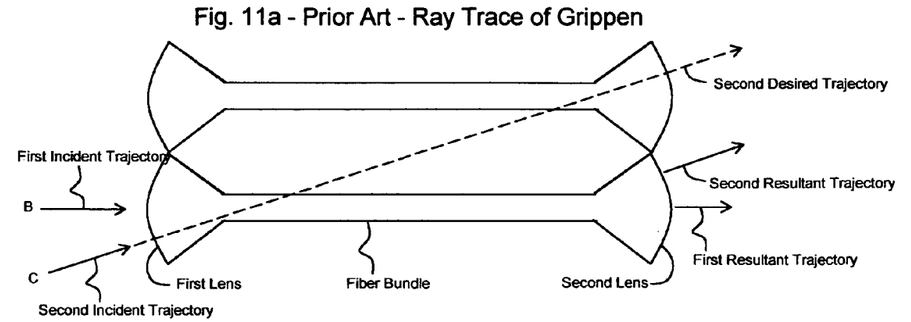
FIG. 11a Prior Art—Ray Trace of Grippin is a top view of two "lens configurations" according to Grippin.
Figure 11B:
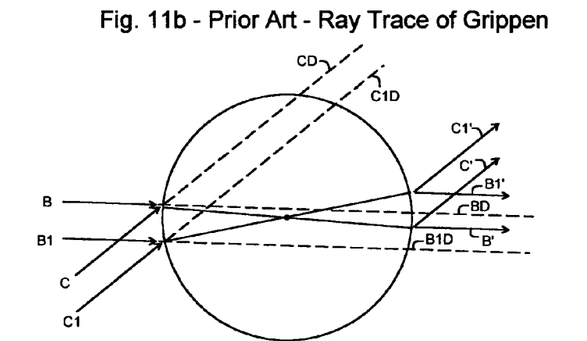
FIG. 11b Prior Art—Ray trade of Grippin is a top view of the two "lens configurations" according to Grippin transferring light from multiple background points.
Figure 11C:
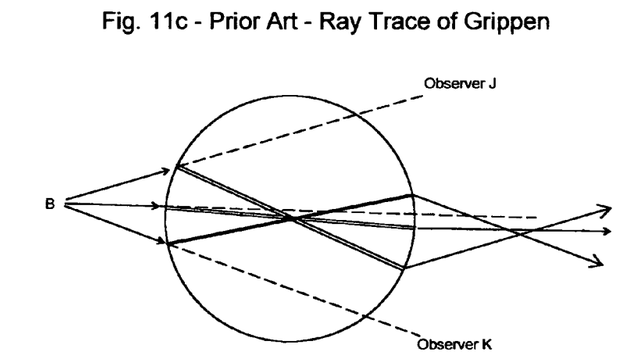
FIG. 11c Prior Art—Ray Trace of Grippin transferring light from a single back ground point B.

FIG. 9a shows a pixel mapping process where a first light trajectory is mapped from a pixel "M" 227 segment to a pixel "N" 225 segment. FIG. 9b shows the pixel mapping process of FIG. 9a where a second light trajectory is mapped from a pixel "M" 227a segment to a pixel "O" 231 segment. FIGS. 9a and 9b illustrate how lasers can be used to construct a map of which pixel segments correspond with which pixel segments. It is assumed that a navy beach assault craft 221 depicted has been fitted with permanent 3D pixel skin. When mapping the 3D pixel skin, Laser 1 223 and Laser 2 229 are always sending beams that are exactly opposite. At the mapping center, an electronic means for identifying which segment of which pixel cell is receiving laser light is utilized. In the fiber optic embodiment, a means for detecting which fibers are receiving the respective two laser lights is utilized. In FIG. 9a, Laser 1 is registered by a segment of pixel cell N, Laser 2 which is exactly opposite in trajectory of Laser 1 is registered in a segment of pixel cell M. These two respective segments are therefore mapped as a corresponding set of segments that will always communicate with one another. (Their fiber optic cables can be welded together at the mapping center, or alternately in the electrooptic embodiment, a CPU and memory can make note that they are a corresponding pair of pixel segments.) In FIG. 9b, Laser 2 strikes a second segment of pixel M 227a, while Laser 1 is registered by a segment of pixel cell "O" 231. These two segments are therefore mapped as a corresponding segment pair. Note that if M has one hundred segments, it will communicate with one hundred segments of one hundred different pixel cells. It is important to note conceptually that the pixel segments that correspond to the M pixel segments will be located on every surface of the Army beach assault craft (as is illustrated in FIG. 10). This is why an observer viewing from any perspective will see an accurate representation of the cloaked object's background. Once a number of Pixel segments are mapped by laser, the rest of the pixels can be mapped by logic in software designed to mathematically create the map. Alternately, the laser process can be used to generate the whole pixel map. In a rigid application, once the map is generated it is permanent. It can however periodically be recalibrated to ensure its precision. In the fiber optic embodiment, each of the fibers of each respective pixel cell segment is paired physically by splicing or welding with one corresponding fiber. In the electronic LED photodiode embodiment, each receiving pixel segment is associated with one sending segment with this relationship being stored in a computer memory.

FIG. 10 is an asset covered in segmented pixel skin. It illustrates that one representative pixel cell has segments that correspond to pixel cell segments on multiple sides of the cloaked object. FIG. 10 illustrates five different trajectories of light entering one pixel cell which is one among many pixel cells on a mounted 3D Pixel Skin covered asset. Note that each of the five different trajectories emerges from a different surface. Each of the five exiting trajectories is the same as its respective entering trajectory. In practice, each pixel cell may separate light into tens of different relative trajectories some of which emerge from every surface of the object. Light enters a pixel cell at a first trajectory 241 and exits on the same first trajectory at 241a Light enters the same pixel cell at a second trajectory 243 and exits at that same second trajectory at 243a Light enters the same pixel cell at a third trajectory at 245 and exits at that same third trajectory at 245a Light enters the same pixel cell at a fourth trajectory 247 and exits at the same fourth trajectory 247a Light enters the same pixel at a fifth trajectory 249 and exits at that same fifth trajectory 249a. Thus light received from one pixel cell on a first surface exits from all other surfaces of the cloaked asset. In a perfect cloaking system, the one pixel on a first side of the cloaked object would have similar relationships with every pixel on every other side of the cloaked asset. This causes the observer who is moving around the cloaked object to see every background point through every pixel on the object. In practical application some averaging would occur such that the background reproduction is not perfect.

FIG. 10 illustrates thousands of light receiving and sending segmented pixels such as the art of FIG. 4 and FIG. 5 are affixed to the surface of the object to be concealed. Each receiving segmented pixel receives colored light from the background of the object such as first trajectory 241, second trajectory 243, third trajectory 245, fourth trajectory 247, and fifth trajectory 249. Each receiving segmented pixel has a lens such that the light incident upon it is segmented to form focal points along a focal curve (or plane) such as first focal collecting segment 111 and focal curve segment 115 of FIG. 4 and first photodiode 127 of FIG. 5 according to the light's incident trajectory such as second light trajectory 101 and second light trajectory 107 of FIG. 4 and a first sensed trajectory 130 of FIG. 5. In a first embodiment, this incident light is channeled by fiber optics such as first fiber optic relay 113 and second fiber optic 117 to the side of the object which is opposite to each respective incident light segment. The light which was incident on a first side of the object traveling at a series of respective trajectories is thus redirected and exits on at least one second side of the object according to its original incident trajectory such as same first trajectory 241a, same second trajectory 243a, same third trajectory 245a, same fourth trajectory 247a, and same fifth trajectory 249a In this manor, incident light is redirected as exiting light that mimics the incident light's trajectory, wavelength, color, and intensity such that an observer can "see through" the object to the object's background. In a second embodiment, this incident light is segmented according to trajectory, and detected electronically by photo diodes such as the first photodiode 127 of FIG. 5. It is then electronically reproduced on at least one second side of the object by arrayed LEDs such as same first trajectory 241a, same second trajectory 243a, same third trajectory 245a, same fourth trajectory 247a, and same fifth trajectory 249a. In this manor, incident light is reproduced as exiting light which mimics trajectory, wavelength, color, and intensity such that an observer can "see through" the object to the background. In both embodiments, this process is repeated many times, in segmented pixel arrays, such that an observer looking at the object from any perspective actually "sees the background" of the object corresponding to the observer's perspective. The object having thus been rendered "invisible" to the observer due to its 3D light mimicking by means of incident light collection and redirection and/or sensing and reproduction.

CONCLUSION, RAMIFICATIONS, AND SCOPE

Thus the reader will see that the Multi-Perspective Background Simulation Cloaking Process and Apparatus of this invention provides a highly functional and reliable means for using well known technology to conceal the presence of an object (or asset). This is achieved optically in a first embodiment and electronically in a second embodiment.

While the above description describes many specifications, these should not be construed as limitations on the scope of the invention, but rather as an exemplification of one preferred embodiment thereof. Many other variations are possible.

Lenses which enable wide angle light segmentation at the pixel level can be designed in many configurations and in series using multiple elements, shapes and gradient indices. Light can be directed by a lens to form a series of focal points along a focal plane instead of a along a focal curve. A fiber optic element can be replaced by a light pipe with internal reflection means that performs substantially equivalently. Photo diodes and LED's can be replaced by other light detecting and light producing means respectively. The mapping means can consist of a simple plug which connects prefabricated (and pre-rapped) segmented pixel array components designed to fit onto a particular asset.

The electronic embodiment segmented pixel receiving array (trajectory specific Photo diode array) can be used as input for a video recording and storage means. (This is a novel camera application of the present invention.) The electronic embodiment segmented pixel sending array (trajectory specific LED array) can be used as an output means for displaying video images which enable multiple users in different positions to view different perspectives simulteanously on a single video display device. Alternately, one viewer moving around relative to the display will see different images as they would moving around in the real world. (This is a novel video display application of the present invention.)

The fiber optic embodiment segmented pixel receiving array (trajectory specific fiber array) can be used as input for a video recording and storage means. (This is a novel camera application of the present invention.) The fiber optic embodiment segmented pixel sending array (trajectory specific fiber array) can be used as an output means for displaying video images which enable multiple users in different positions to view different perspectives simulteanously on a single video display device. Alternately, one viewer moving around relative to the display will see different images as they would moving around in the real world. (This is a novel video display application of the present invention.)

I claim:

1. A multi-perspective camouflage system for reducing the observability of an animate or inanimate object comprising;
   a first optic positioned on a first side of the object to be camouflaged,
   a first electromagnetic radiation emitter selected from the group consisting of; fiber optic, and electro-photonic emitter,
   a second electromagnetic radiation emitter selected from the group consisting of; fiber optic, and electro-photonic emitter,
   a second optic positioned on a second side of the object to be camouflaged, and
   a third optic positioned relative to the object on a side selected from the group consisting of; said
   second side, and a third side,
   whereby said first electromagnetic radiation emitter provides a first electromagnetic radiation which passes through at least one surface of said first optic to be observable from a first physical observation perspective and whereby said second electromagnetic radiation emitter provides a second electromagnetic radiation which passes through at least one surface of said first optic to be observable from a second physical observation perspective and wherein said first electromagnetic radiation is not observable from said second physical observation perspective and wherein said first electromagnetic radiation mimics with respect to at least one attribute selected from the group consisting of; wavelength, color, intensity, and trajectory at least a portion of electromagnetic radiation which was incident upon said second optic and wherein said second electromagnetic radiation mimics with respect to at least one attribute selected from the group consisting of; wavelength, color, intensity, and trajectory at least a portion of electromagnetic radiation which was incident upon said third optic.

2. The multi-perspective camouflage system for reducing the observability of an animate or inanimate object of claim 1 wherein said first electromagnetic radiation is representative of a first section of the background of said object and wherein said second electromagnetic radiation is representative of a second section of the background of said object.

3. The multi-perspective camouflage system for reducing the observability of an animate or inanimate object of claim 1 wherein at least one surface of said first optic refracts at least some of said first electromagnetic radiation passing therethrough.

4. The multi-perspective camouflage system for reducing the observability of an animate or inanimate object of claim 1 wherein said first optic has a first surface and a second surface and said first electromagnetic radiation passes through said first surface and then through said second surface and said first electromagnetic radiation emitter also serves as an electromagnetic radiation receiver either intermittently or concurrently receiving electromagnetic radiation after the received electromagnetic radiation has passed in succession through said second surface of said optic and then passed through said first surface of said optic.

5. The multi-perspective camouflage system for reducing the observability of an animate or inanimate object of claim 1 whereby said first electromagnetic radiation emitter and said second electromagnetic radiation emitter are positioned among a plurality of emitters which are together positioned in a convex array so as to each efficiently emit electromagnetic radiation through said first optic and into respective ranges of background areas surrounding said object.

6. The multi-perspective camouflage system for reducing the observability of an animate or inanimate object of claim 1 wherein said first optic has a first surface and a second surface and said first electromagnetic radiation passes through said first surface and then through said second surface and wherein at least one electromagnetic radiation receiving element selected from the group consisting of; fiber optic, and photon sensor is provided which receives at lease some electromagnetic radiation after it passes successively through said second surface and then through said first surface.

7. The multi-perspective camouflage system for reducing the observability of an animate or inanimate object of claim 6 further comprising a plurality of electromagnetic radiation receivers each receiving at lease some electromagnetic radiation after it passes successively through said second surface and then through said first surface.

8. The multi-perspective camouflage system for reducing the observability of an animate or inanimate object of claim 7 wherein at least some of said electromagnetic radiation receivers are positioned in a convex array.

9. The multi-perspective camouflage system for reducing the observability of an animate or inanimate object of claim 1 whereby said first electromagnetic radiation mimics a section of a background of said object in at least one aspect selected from the group consisting of; wavelength, intensity, and trajectory.

10. The multi-perspective camouflage system for reducing the observability of an animate or inanimate object of claim 1 further providing a plurality of optics positioned in close proximity to said first optic each optic having at least two electromagnetic radiation streams passing therethrough whereby the combination of said plurality of optics and streams produces a plurality of views whereby a sensor of said plurality of optics in a first physical position senses a first collection of combinations of electromagnetic radiation representative of a first segment of mimicked background and a sensor of said plurality of optics in a second physical position senses a second collection of combinations of electromagnetic radiation representative of a second segment of mimicked background.

11. A method for reducing the observability of an animate or inanimate object comprising the steps of;
providing a first optic on a first side of said object,
providing a second optic on a second side of said object,
providing a third optic on a side of the object selected from the group consisting of; said second side, and a third side,
providing a first combination of electromagnetic radiation,
providing a second combination of electromagnetic radiation,
whereby said first combination of electromagnetic radiation mimics with respect to at least one attribute selected from the group consisting of; wavelength, color, intensity, and trajectory, the electromagnetic energy which was incident upon said second optic and said first combination of electromagnetic radiation passes through at least one surface of said first optic so as to be observable from a first physical observation perspective and whereby said second combination of electromagnetic radiation mimics with respect to at least one attribute selected from the group consisting of; wavelength, color, intensity, and trajectory, the electromagnetic energy which was incident upon said third optic and said second combination of electromagnetic radiation passes through at least one surface of said first optic so as to be observable from a second physical observation perspective,
and wherein said first combination of electromagnetic radiation is not observable from said second physical observation perspective.

12. The method for reducing the observability of an animate or inanimate object of claim 11 wherein said first combination of electromagnetic radiation is representative of a first section of the background of said object and wherein said second combination of electromagnetic radiation is representative of a second section of the background of said object.

13. The method for reducing the observability of an animate or inanimate object of claim 11 wherein at least a portion of said first electromagnetic radiation combination is emitted by at least one electromagnetic radiation emitter selected from the group consisting of; fiber optic, and electro-photonic emitter.

14. The method for reducing the observability of an animate or inanimate object of claim 13 wherein said emitter also acts as an electromagnetic radiation receiving element either intermittently or concurrently receiving electromagnetic radiation which passes through said first optic in the opposite direction of said first combination of electromagnetic radiation.

15. The method for reducing the observability of an animate or inanimate object of claim 11 further providing a plurality of electromagnetic radiation emitters which emit electromagnetic radiation at least some of which passes through said first optic.

16. The method for reducing the observability of an animate or inanimate object of claim 15 whereby at least some of said electromagnetic emitters are positioned in a convex array.

17. The method for reducing the observability of an animate or inanimate object of claim 11 wherein said first physical perspective is on a first side of said first optic and further providing on a second side of said first optic at least one electromagnetic radiation receiver selected from the group consisting of; fiber optic, and photon sensor.

18. A The method for reducing the observability of an animate or inanimate object of claim 13 wherein said electromagnetic radiation emitter also acts as an electromagnetic radiation receiver either intermittently or concurrently receiving electromagnetic radiation which passes through at least one surface of said first optic.

19. The method for reducing the observability of an animate or inanimate object of claim 11 wherein said first combination of electromagnetic radiation mimics a section of a background of said object in at least one aspect selected from the group consisting of; wavelength, intensity, and trajectory.

20. The method for reducing the observability of an animate or inanimate object of claim 11 further providing a plurality of optics each having at least two electromagnetic radiation streams passing therethrough whereby the combination of said plurality of optics produces a plurality of views whereby a sensor of said plurality of optics in a first physical position senses a first collection of combinations of electromagnetic radiation and a sensor of said plurality of optics in a second physical position senses a second collection of combinations of electromagnetic radiation.

* * * * *